May 1, 1956  S. E. REA  2,744,181
EXTENSOMETERS
Filed April 21, 1953  2 Sheets-Sheet 1

INVENTOR.
STANLEY E. REA
BY
Reynolds, Beach & Christensen
ATTORNEYS

May 1, 1956  S. E. REA  2,744,181
EXTENSOMETERS

Filed April 21, 1953  2 Sheets-Sheet 2

INVENTOR.
STANLEY E. REA
BY
Reynolds, Beach & Christensen
ATTORNEYS

United States Patent Office 2,744,181
Patented May 1, 1956

2,744,181

EXTENSOMETERS

Stanley E. Rea, Kent, Wash., assignor to Boeing Airplane Company, Seattle, Wash., a corporation of Delaware Application April 21, 1953, Serial No. 350,050

14 Claims. (Cl. 201—63)

This invention relates generally to extensometers and more particularly concerns a novel device of that character which may be used conveniently for the detection and measurement of both strain and distribution of strain along a given length or over a given portion, such as a critically loaded portion of a stressed member. The invention is herein illustratively described by reference to its presently preferred form as applied to the measurement of strain and strain distribution in the simple case of a straight bar member loaded directly in tension; however, it will be readily appreciated that the characterizing features of the invention are applicable in a variety of ways and in different specific forms. The term "extensometer" is herein used in a broad sense, connoting an instrument capable of detecting or measuring strain caused by any of various types of stress in a loaded member.

There are in existence a variety of extensometer devices making use of electrical strain gauges and the like. Ordinarily these devices have been applied for detecting or measuring the total or over-all strain occurring in a loaded member between two widely spaced points thereon bracketing the assumed point of failure. From such tests as these the elastic limit, the yield point and other useful characteristics of the test specimen are readily determined. Likewise strain gauges have been used in various other fields of inquiry such as indeterminations of force, acceleration, displacement, etc., but again the desired information is ordinarily gained by applying the strain gauge in a manner determining the over-all or total distortion of a calibrated member or stressed part. In none of these cases or others within the knowledge of the present inventor have provisions been made for experimentally measuring with accuracy the distribution of strain in a member, nor the incremental amounts of strain occurring in a succession of small increments lying along a line of distortion in a test member.

It is known that the strain occurring in a bar under stress varies from one point to another depending upon the existing stress distribution therein and upon the degree of loading of the bar in terms of its total elastic limit. For instance, in the case of a straight bar loaded in tension, the strain developed at various points along the length of the bar will differ in accordance with the cross section. Even in the case of a nominally uniform bar a critical area will develop in which the strain increases more rapidly than in other areas as the bar is loaded up to and beyond the elastic limit. This critical portion is usually short in terms of the distances normally dealt with in conducting stress-strain tests and is often referred to as the plastic region. It is that portion which exhibits the greatest distortion under heavy stress and which includes the fracture point when the member actually breaks under the applied load.

The present invention is based on the concept that by measuring the strain developed in each of a number of successively arranged length increments in the plastic region under different applied loads, useful specific design information is thereby obtained which enables correcting the form of structural parts for meeting particular load requirements and for eliminating unnecessary weight or mass in a part.

With these and other considerations in view, the present invention provides an extensometer device enabling the above studies to be made conveniently. More particularly the invention provides an extensometer device which is compact, flexible in use, and readily employed for conducting reliable tests on members of different sizes and forms.

Still another object of the invention is the provision of an electrical strain gauge type extensometer having a strain gauge unit so arranged as to enable measuring strain occurring in a test specimen between two or more very closely spaced points thereon.

Another object of the invention is such an extensometer which may incorporate any desired number of strain-displaced work contact points and associated strain gauge elements responsive to displacement of such contact points during a strain test.

In its illustrated form the invention comprises an extensometer having a plurality of resilient strips maintained in closely spaced parallel relationship by a common support and each strip carrying a contact point for engaging the test specimen at one of a plurality of points extending along a predetermined strain line. A strain gauge element, preferably of the electrical resistance wire type is adhered to each strip and undergoes a measurable change of resistance accompanying bending deflection of the individual strips accompanying displacement of the associated contact point when the test specimen undergoes strain. The strain deflected resilient strips and associated strain gauge elements thereon are relatively thin so that an extensometer of the described type may incorporate a large number of these units and still be highly compact and readily applied to small specimens or generally used under confining space conditions.

More specifically, in the preferred form the invention comprises two series of the flexible resilient strips so disposed and mounted that a test specimen may be gripped between their associated contact points as opposing jaws. The thin strips making up the opposed jaws are interleaved at their base ends so as to provide a convenient means of establishing the desired close spacing between the projecting ends of these strips, which spacing may be increased if desired by additional spacer elements. Preferably these jaws pivot relatively to each other on a common bolt or equivalent pivotal support common to all the strips and permitting each strip to move relative to the others so that a uniform biting contact of the point of each such unit with the face of the test specimen may be achieved regardless of thickness variations or surface irregularities in the specimen. Resilience of the strips maintains pressure of their contact points with the test specimen so that the points do not slide on the specimen as strain develops therein, whereby the individual strain gauge elements measure true strain occurring in the incremental segments of the specimen.

These and other features, objects and advantages of the invention including certain details of construction of the preferred forms thereof will become more fully evident from the following description by reference to the accompanying drawings.

Figure 1:
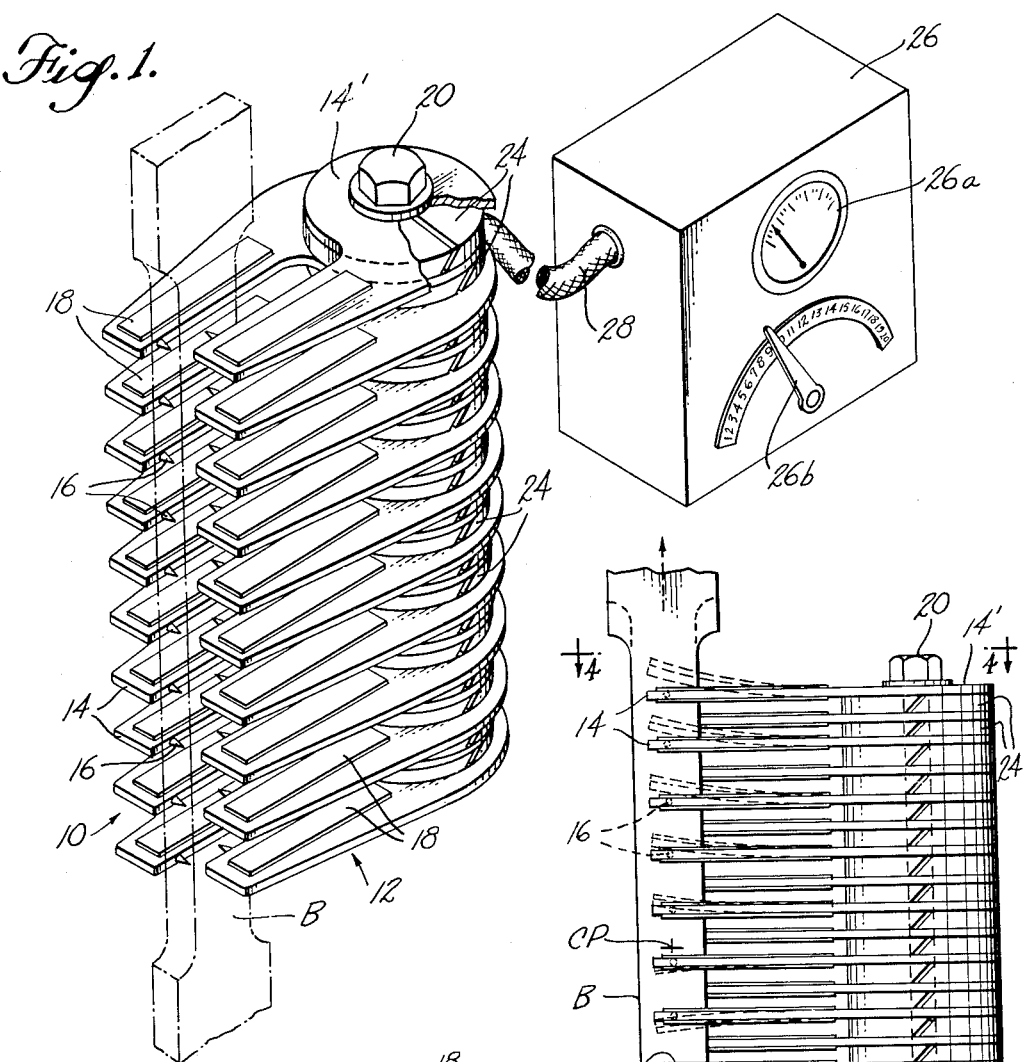
Figure 1 is a perspective view of the improved extensometer as applied to a test member in the form of a bar to be loaded in tension.

As shown in Figure 1, the improved extensometer may be readily applied to the testing of a bar B in tension in order to yield information concerning both the strain and the distribution of strain at various points in the bar accompanying different values of load. In general the device comprises two opposed jaws 10 and 12 each comprising a plurality of initially parallel resilient strips 14 which carry needlesharp work contact points 16 and an electrical resistance wire strain gauge element 18 adhesively bonded in suitable fashion to one face of the resilient strip so as to experience either tension or compression along its length as the strip is bent out of its initial flat form. When properly adjusted relative to the test bar B, the contact point 16 of each resilient strip will bite slightly into the surface of the bar under a resilient force established and maintained by the resiliency of the strip itself. In order to hold the individual strips in proper relationship and to maintain a resilient stress in the strip for the purpose of holding its contact points firmly against the face of the test bar, the strips have enlarged base portions 14' which overlap and are apertured to receive a clamp bolt 20 carrying a nut 22 which is tightened in order to prevent relative swinging of any strip out of contact with the bar once the initial contact pressure is established. The securing bolt 20, therefore, serves both as a clamping means holding the jaws 10 and 12 in predetermined relationship and also as a means permitting pivoting of the jaw elements toward and from each other into any desired relationship or spacing corresponding to the thicknesses of different test specimens. In the illustrated case lock washers 24 of the diagonally slit type are interposed between successively adjacent strips of the interleaved strip assembly in order to establish a desired spacing between adjacent strips and to prevent any strip from swinging away from the test member after the nut 22 is tightened and the device is ready for conducting a test.

Inasmuch as the base ends of all the strips have a common fixed support, the bending deflection of the individual strips and the electrical response of their associated strain gauge element, as the test bar B undergoes strain constitutes a true representation of the actual strain displacement occurring at each of the several points on the test specimen engaged by the needle-like elements 16. Thus the difference between the deflections of any two adjacent strips constitutes a direct measure of the incremental strain occurring in the short length of the bar B lying between such strips at any particular value of loading. This difference will vary between different pairs of strips along the length of a bar especially as a plastic region is being developed and the breaking point is approached at a location between two of the strips. Of course, by the same token the relative deflection occurring between the opposite endmost strips of the jaws constitutes a direct measure of the total strain occurring in the test specimen over the included length between such strips. Ordinarily the jaws 10 and 12 are so placed along the length of a test specimen as to include the region which is predicted to be the plastic region of the specimen under critical loading.

Figure 2:
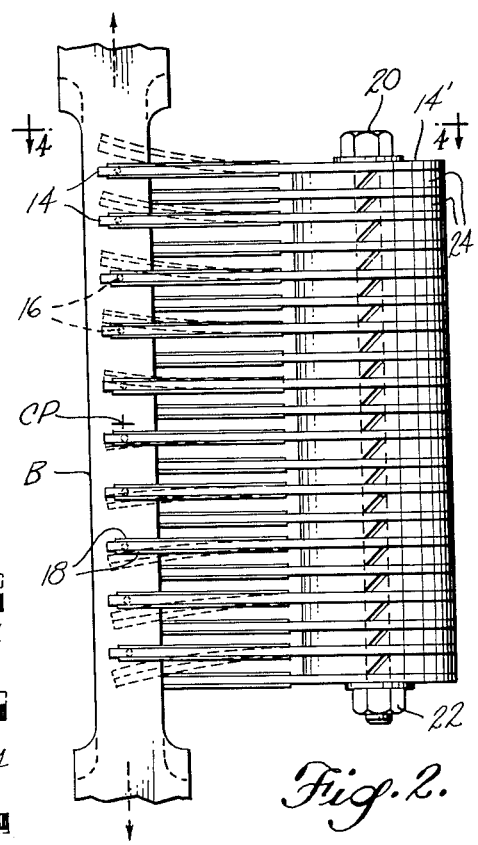
Figure 2 is a side view of the device as applied to the bar under test.

In order to provide a detectable quantitative measure of the deflection of each individual strip 14 at different values of test load, each such strip carries one or more of the electrical resistance strain gauge elements 18. In Figure 2 there are two such elements on a strip, one adhered to the top face and one to the bottom face thereof. These elements may be connected so that their electrical response to strip deflection is cumulative or additive in a metering circuit capable of registering the change in electrical resistance of these elements under strain conditions. Suitable electrical circuits, including various bridge type circuits and the like, are available in well known forms for measuring, indicating and recording, if desired, the variation in resistance of a strain gauge of this type so that the details of a suitable circuit are omitted from this disclosure. In Figure 1 the unit 26 represents electrical circuit apparatus connected by a multiple-conductor cable 28 to the individual strain gauge elements 18 associated with the different flexible strips 14 in the extensometer proper. For instance, the apparatus 26 may comprise a galvanometer 26a for registering, in proper units, the total deflection of any individual strip 14, and a selector switch 26b operable manually to connect the metering circuit to any of the several strain gauge elements 18 and to indicate the element chosen at any particular time. If desired, recording apparatus may be incorporated in order to register simultaneously the different values of deflection of all of the individual strips 14 during each test load applied to the specimen B. These and other possible ways of converting deflection of the individual strips 14 into readable quantities for measurement purposes are well known.

Figure 4:
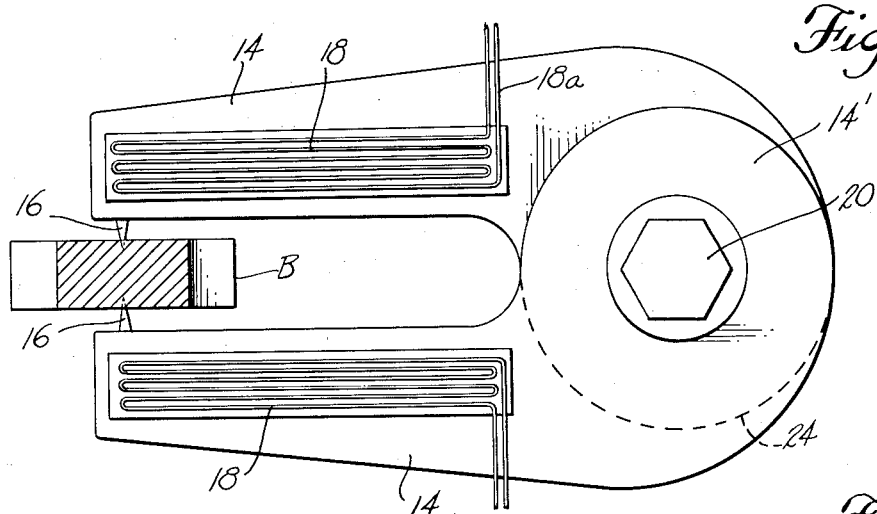
Figure 4 is a top sectional view taken on line 4—4 in Figure 2.

The electrical resistance strain gauge element wire 18a may be so arranged on the face of the associated strip 14 (Figure 4) that the change in electrical resistance of the wire caused by bending of the strip is substantially proportional to the strain-produced displacement of the point 16. Preferably the resilient strips 14 are long in relation to the strain displacement of the contact points during a test, so that the bending along the length of the strip tends to be uniform at the different values of load applied to the test specimen. Another reason for employing relatively long strips is that the arc of swing of the contact points 16 will not depart greatly from a straight line corresponding to the line of displacement of the point on the test specimen initially engaged by the contact element accompanying progressive application of load to the specimen. Some curvature of swing is inevitable, however, in the illustrated case, and the tendency therefore is for the individual contact points to slide a slight amount transversely to the true strain line as load is progressively applied to the test specimen. In many cases the effect of this is negligible.

Figure 6:
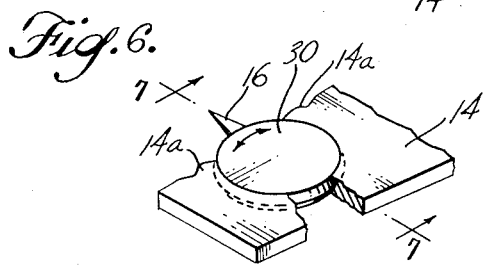
Figure 6 is a fragmentary perspective view illustrating a modified type of contact point which may be used in association with each strain gauge element.
Figure 7:
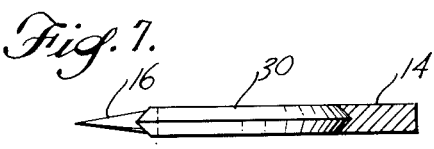
Figure 7 is a sectional side view of the same taken on line 7—7 in Figure 6.

However, if great precision is desired in the results of a strain test with the illustrated type of device, it is readily possible to overcome the tendency for the contact points 16 to slide on the surface of the test specimen in a direction transverse to the strain line by pivotally mounting the points in the ends of the flexible strips 14. Figures 6 and 7 illustrate one convenient pivotal mounting for the contact points, whereas Figures 8 and 9 illustrate an alternative arrangement.

In Figures 6 and 7 the side edge of the strip 14 near its projecting end has a rounded slot milled therein with valleyed sides. A flat round disk 30 received in this slot has a double-chamfered edge received in the slot side channel, and is held in place in the slot by swaging over the ends of the slotted strip edge at 14a. Thus the disk is freely revolved in the slot about a central axis perpendicular to the plane of the strip, but is snugly retained in the slot against any degree of displacement relative to the surrounding body of strip material. The contact point 16 then projects from the exposed edge of the disk to engage the surface of a test specimen in the illustrated manner.

Figure 8:
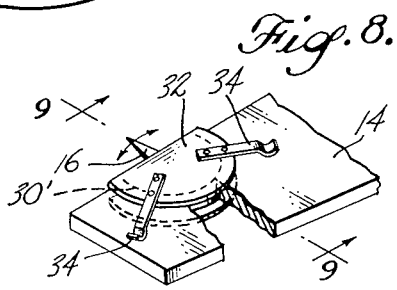
Figure 8 is a perspective view of a second modified contact point according to the invention.
Figure 9:
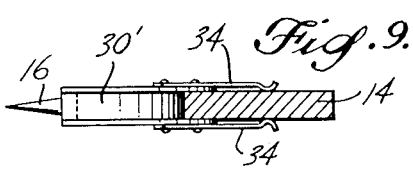
Figure 9 is a sectional side view of the same taken on line 9—9 in Figure 8.

In Figures 8 and 9 the construction is modified to the extent that a channeled or valleyed slot edge is not required, although swaging of the end edges of the slot is employed to hold the disk 30' in place. Shifting of the disk in a sense perpendicular to the plane of the strip 14 is prevented in this case, however, by the keeper plates 32 secured to the opposite faces of the disk 30' and overlapping the strip 14 adjacent the slot edges to slide on the respectively opposite faces of said strip. Sets of spring fingers 34 anchored to the plates 32 bear against the strip faces 14 and tend by friction to hold the disk 30' in a particular rotated position preliminary to establishing contact of the point 16 with the surface of a test specimen. However, the frictional force created by these spring fingers is insufficient to prevent rotation of the disk 30' during a strain test in order to permit the point 16 to follow the line of displacement of the contacted area on the test specimen as load is progressively applied thereto.

Figure 3:
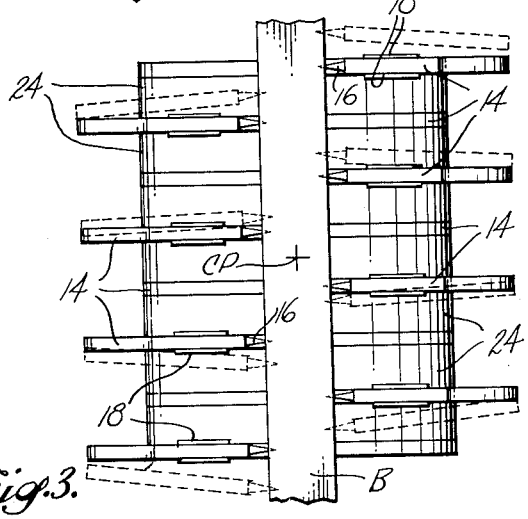
Figure 3 is an enlarged fragmentary side view taken at right angles to the view in Figure 2.

Figures 2 and 3 illustrate the type of displacement of the individual strain gauge strips during a load test on a straight bar stressed in tension. The actual center of strain in the assumed plastic region of the bar is designated CP in both figures, and in setting up the extensometer for conducting the test it is preferable to center the jaws with respect to this point so that the strain measurements taken will bracket the critical region in the test specimen as applied load is increased to and beyond the elastic limit. As tension load is applied to the bar specimen B (Figure 2), the uppermost strip will undergo the greatest upward deflection, whereas the lowermost strip will undergo the greatest downward deflection due to strain displacement of the surface areas of the specimen being contacted by the several points 16. Inasmuch as the test specimen is assumed to be a uniform bar in the example, it will be seen that the strain gauge strips located immediately above and immediately below the point CP will undergo the least amount of upward and downward deflection respectively relative to the bolt 20 constituting the base of the extensometer device. This observation applies during that portion of the test during which the load is being progressively increased up to the elastic limit of the bar. Moreover, it is also true during loading of the bar beyond the elastic limit and to the yield point if the point CP constitutes the true center of the plastic region of the specimen. Thus the dotted line positions of the deflected strain gauge strips shown in Figure 2 represent the relative positions of the extensometer elements under an assumed value of load during which either of the foregoing conditions apply.

In Figure 3, constituting an elevation view taken at right angles to the view in Figure 2, that is, constituting a view looking at the projecting ends of the several strips 14, it will be seen that there is some slight amount of torsional distortion in the strips accompanying bending deflection thereof when the test specimen is under strain. However, this distortion does not deleteriously influence the accuracy of the strain gauge measurements being provided. In fact, it is found that there is a substantially linear and proportional relationship between the change in electrical resistance of the strain gauge element wires and strain displacement of the associated contact points 16. If desired, modified mountings for the strips 14 could be provided which eliminate the torsional distortion depicted in Figure 3.

With each of the individual strain gauge contact points 16 pressed firmly against the adjacent side of the test specimen in order to bite slightly into the material, the nut 22 is tightened on the bolt 20 to hold the strips in position. The resilience of the individual strips maintains a substantially equal pressure of all of the contact points against the specimen. Moreover, the total weight of the assembly of strips including the bolt 20 and the washers 24 is not great, and it is possible to rely upon the holding action of the points 16 to support that weight provided proper zero adjustment is made when taking the reading of each of the individual strain gauge elements in order to account for any initial deflection in the strain gauges due to the supported weight of the extensometer. External support means for the extensometer may be provided, however, in order to eliminate initial deflection in the strain gauge elements. This precaution is not an important one, however, due to the fact that an initial or zero adjustment of the indicating apparatus which measures the electrical resistance of the strain gauge element wires is ordinarily necessary anyway, since these wires do not necessarily exhibit precisely identical resistance values. Thus when preparing to conduct a test, the selector switch 26b is adjusted to each of its several positions and the reading of the galvanometer 26a is taken for each of the strain gauge elements 18 before any load is applied to the test specimen. Thereupon an initial value of load is applied to the test specimen and the meter readings are again taken. This process is repeated any desired number of times corresponding to progressive increases in the applied test load, until the desired range of loading is covered. The succession of meter readings taken for each of the strain gauges 18 are then corrected for calibration purposes by subtracting the value of the initial readings mentioned above .

The corrected readings representing strain displacement of the associated contact points 16 at different values of test load may then be plotted on a graph with relation to the initial positions or interval spacings of the several contact points. From such a graph or from calculations obtained without benefit thereof, the modified graph appearing in Figure 5 may be drawn in which the abscissae represent the successive increments or intervals between successively adjacent contact points of the extensometer applied to the test specimen and the ordinates represent the percentage of elongation or strain of each of the increments or intervals relative to the total at different values of test loading. From a graph such as this it is possible to determine the distribution of strain in the specimen at different values of loading and to locate the true center of the plastic region. In the illustrated case the true center of this region happens to correspond with the assumed center CP taken as the centering point for the extensometer jaws when preparing for the test. Actually, however, this critical or breaking point in the graph may occur on either side of the assumed center point CP. By providing an extensometer having a large number of closely spaced strain gauge strips there is assurance that the extensometer elements will bracket or cover the plastic region even though it is offset somewhat from the assumed location.

Figure 5:
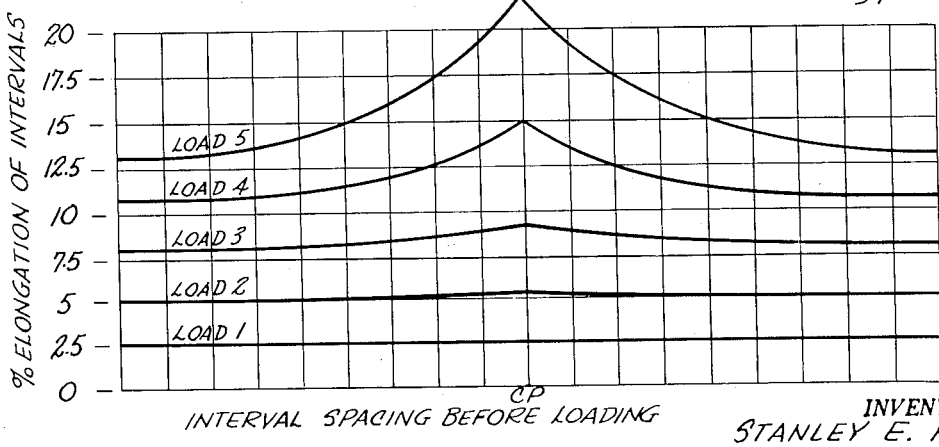
Figure 5 is a graph illustrating the type of information which may be derived from the use of the improved extensometer in the illustrative case.

From a graph such as that shown in Figure 5 corrective design of test parts may be made and much other useful information may be derived concerning tested parts.

It will be appreciated that various changes or modifications may be made in the illustrated form without departing from the essentials of the invention. In some cases for instance a single set or series of strain gauge strips engaging a specimen may be employed to measure strain and strain distribution along a succession of increments. In all cases the total number and the incremental spacing of the strips or contact points is a matter of design selection. By having successive strips in the extensometer located alternately on opposite sides of a specimen, however, the problem of establishing and maintaining point contact pressure against the specimen along a strain line is simplified. Moreover it is possible to employ a greater number of strips, hence closer effective spacing thereof, in a given over-all length of the device. Other types of anti-slide contact elements and other strip forms and mountings are also possible, but that illustrated for testing bar stock and the like is presently the preferred form because of the factors of low cost, simplicity, ease of use, etc.

I claim as my invention:

1. Extensometer apparatus comprising a plurality of relatively thin and flexible strip members each having an electrical resistance wire strain gauge element thereon responsive to strip member bending deflection, means supporting said strip members in generally parallel closely spaced relationship projecting in relatively superposed positions from said supporting means, and anti-slide contact elements carried by the respective strips in corresponding locations on projecting end portions thereof to engage the face of a member subject to strain and thereby deflect said strips by different amounts accompanying strain-displacement of said individual contact elements.

2. The extensometer apparatus defined in claim 1, wherein the supporting means includes releasable locking means normally holding the strip members against relative edgewise movement on said supporting means, and means permitting such edgewise movement of the individual strips relative to each other after release of said locking means for adjusting the relative positions of the contact elements to engage the strain member with independently established contact pressures thereon.

3. The extensometer apparatus defined in claim 1, wherein the strips have apertured base ends and the supporting means comprises a bolt extending through the aligned apertures thereof to permit relative swinging of individual strips about the axis of the bolt, and locking means cooperatively associated with said bolt for releasably clamping the strips together and holding the same in established relative positions thereon.

4. Extensometer apparatus comprising a plurality of relatively thin and flexible strip members each having a strain gauge element thereon responsive to strip member bending deflection, means supporting said strip members in generally parallel closely spaced relationship projecting in relatively superposed positions from said supporting means, and anti-slide contact elements carried by the respective strips in corresponding locations on projecting end portions thereof to engage the face of a member subject to strain and therby deflect said strips by different amounts accompanying strain-displacement of said individual contact elements.

5. Extensometer apparatus comprising a plurality of relatively thin and flexible strip members, each such member having at least one electrical resistance wire strain gauge element on each side thereof responsive to strip member bending deflection, means supporting said strip members in generally parallel closely spaced relationship projecting in relatively superposed positions from said supporting means, and anti-slide contact elements carried by the respective strips in corresponding locations on projecting end portions thereof to engage the face of a member subject to strain and thereby deflect said strips by different amounts accompanying strain-displacement of said individual contact elements.

6. Extensometer apparatus comprising a pair of clamping jaw structures each comprising a series of several generally parallel relatively thin and flexible strain gauge elements supported in relatively close superposed relationship, each such strain gauge element responding to bending deflection thereof, means interconnecting said jaw structures for relative adjustment of their respective series of strain gauge elements together and apart to grip a member subject to strain therebetween, anti-slide contact elements associated with the respective strain gauge elements in corresponding positions relative to such elements to bear against the gripped sides of the strain member at a succession of several points along a line of strain, thereby to deflect said strain gauge elements according to strain displacement of the respective points engaged on such strain member.

7. The extensometer apparatus defined in claim 6, wherein the interconnecting means includes releasable holding means normally holding the jaw structure strain gauge elements in fixed relationship but permitting relative adjustment of the individual strain gauge elements in each jaw structure series upon release of said holding means, thereby enabling establishment of approximately equal contact pressures of such contact elements on the strain members.

8. The extensometer apparatus defined in claim 7, wherein the individual strain gauge elements are carried by resiliently flexible thin metal strips, the two series of strips having base end portions interleaved in alternate relationship.

9. The extensometer apparatus defined in claim 8, wherein the interconnecting means comprises a bolt passing through aligned apertures in the interleaved strip base end portions and the releasable holding means comprises a clamping nut engaging said bolt.

10. The extensometer apparatus defined in claim 9, lockwashers encircling the bolt and interposed as spacer elements between successively adjacent strip base portions thereon.

11. The extensometer apparatus defined in claim 6, wherein the individual strain gauge elements are carried by resiliently flexible thin metal strips, the two series of strips having base end portions interleaved in alternate relationship.

12. The extensometer apparatus defined in claim 9, wherein the interconnecting means comprises a pivot bolt passed through aligned apertures in the strip base end portions, lockwashers encircling the bolt and interposed as spacer elements between successively adjacent strip base portions thereon, and means for clamping such strips and lockwashers together against relative swinging of said strips about the bolt axis.

13. Extensometer apparatus comprising a series of several generally parallel relatively thin and flexible strain gauge elements supported in relatively close superposed relationship, each such strain gauge element responding to bending deflection thereof, means interconnecting corresponding ends of said elements for relative edgewise adjustment toward and from a member subject to strain positioned alongside said series of elements to be engaged by the free ends thereof, anti-slide contact elements associated with the respective strain gauge elements in corresponding positions on the free ends thereof to bear against the side of the strain member at a succession of several points along a line of strain, thereby to deflect said strain gauge elements according to strain displacement of the respective points engaged on such strain member.

14. The extensometer apparatus defined in claim 13, wherein the contact elements comprise contact points relatively hard and sharp for biting into the surface of a strain member, and pivotal supports for such contact points mounted in the free ends of the respective strips to permit pivoting of said contact points about axes perpendicular to the planes of their respective strips and thereby permitting bending deflection of such strips without sliding of such contact points on the member's surface transversely to the strain line during progressive development of strain in said member.

References Cited in the file of this patent

UNITED STATES PATENTS

| Number | Name | Date |
| --- | --- | --- |
| 2,316,975 | Ruge | Apr. 20, 1943 |
| 2,359,245 | Ritzmann | Sept. 26, 1944 |
| 2,485,977 | Mains | Oct. 25, 1949 |
| 2,487,681 | Weisselberg | Nov. 8, 1949 |
| 2,491,794 | Bachman | Dec. 20, 1949 |